F. M. SHIELDS.
Plow Supporters.

No. 151,549.

Patented June 2, 1874.

Witnesses:
A. Bennerkendorf.
D. Sedgwick.

Inventor:
F. M. Shields
Per
Attorneys.

UNITED STATES PATENT OFFICE.

FRANCIS M. SHIELDS, OF HASHUQUA, MISSISSIPPI, ASSIGNOR TO HIMSELF AND JOHN C. HOLMES, OF SAME PLACE.

IMPROVEMENT IN PLOW-SUPPORTERS.

Specification forming part of Letters Patent No. 151,549, dated June 2, 1874; application filed October 18, 1873.

*To all whom it may concern:*

Be it known that I, FRANCIS M. SHIELDS, of Hashuqua, in the county of Noxubee and State of Mississippi, have invented a new and useful Improvement in Plow-Supporters, of which the following is a specification:

The invention will first be fully described, and then pointed out in the claim.

Figure 1:
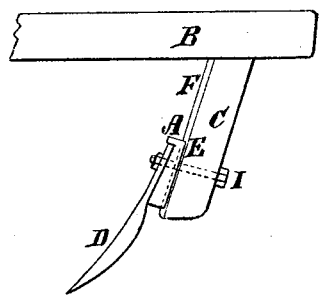
Figure 2:
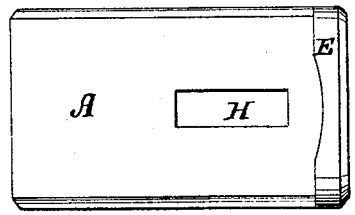
Figure 3:
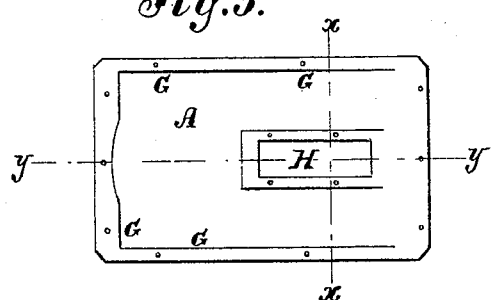
Figure 4:
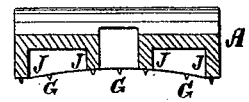
Figure 5:
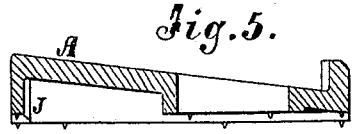

In the accompanying drawing, Figure 1 represents a side view, showing the manner in which the supporter is applied. Fig. 2 is a top view of the supporter. Fig. 3 is a bottom view of the same. Fig. 4 is a cross-section of Fig. 3, taken on the line $x\,x$. Fig. 5 is a longitudinal section of Fig. 3, taken on the line $y\,y$.

Similar letters of reference indicate corresponding parts.

A represents the supporter; B, the plow-beam; C, the stand or stock of the plow. D is the plow shovel or share. The supporter A is preferably made of cast-iron, with a flange, E, on its outer side and upper end, which receives the shank of the shovel, as seen in the drawing. The under side of the supporter is hollowed out to fit the rounded front F of the stock, and the edges of the hollowed inner surface are provided with a series of points, G, which penetrate the wood, and hold the supporter in place. H is a slot-hole through the supporter, and I is a bolt, which passes through the stock, the slot-hole H, and the plow D, as seen in Fig. 1, by which means the plow is held firmly to the stock. The slot H allows the supporter to be raised or lowered on the stock, so as to fit the share.

In this kind of improvement a variety of plows or shares are employed, to adapt it to various crops and soils, varying in form as may be found necessary, and each used as may be required, but all fitting the supporter and fastened in the same manner.

On the inner side of the supporter there are flanges J, around the slotted hole H, as well as around the edges of the supporter, the interior being cut away, as seen in Figs. 4 and 5, to reduce the weight.

Having thus described my invention, I claim as new and desire to secure by Letters Patent—

The wedge-shaped plow-iron support A, having flange E on its upper face, hollowed out and provided with points G on the lower, and having central slot H, as and for the purpose specified.

FRANCIS MARION SHIELDS.

Witnesses:
 W. H. FORBES,
 W. J. HUBBARD.